US008350787B2

(12) United States Patent
Tanba et al.

(10) Patent No.: US 8,350,787 B2
(45) Date of Patent: Jan. 8, 2013

(54) BRIGHTNESS CORRECTION DEVICE AND BRIGHTNESS CORRECTION METHOD

(75) Inventors: Satoshi Tanba, Osaka (JP); Hirokatsu Yui, Osaka (JP); Motohiro Gotoh, Osaka (JP); Shinji Isawa, Osaka (JP); Tetsuya Kohga, Osaka (JP)

(73) Assignee: Panasonic Corporation, Osaka (JP)

( * ) Notice: Subject to any disclaimer, the term of this patent is extended or adjusted under 35 U.S.C. 154(b) by 139 days.

(21) Appl. No.: 13/055,543

(22) PCT Filed: Oct. 14, 2009

(86) PCT No.: PCT/JP2009/005340
§ 371 (c)(1),
(2), (4) Date: Jan. 24, 2011

(87) PCT Pub. No.: WO2010/044256
PCT Pub. Date: Apr. 22, 2010

(65) Prior Publication Data
US 2011/0181567 A1    Jul. 28, 2011

(30) Foreign Application Priority Data

Oct. 15, 2008  (JP) ................................. 2008-265979
Nov. 19, 2008  (JP) ................................. 2008-295241

(51) Int. Cl.
*G09G 3/30*  (2006.01)

(52) U.S. Cl. .............. 345/77; 345/63; 345/84; 345/207; 348/602

(58) Field of Classification Search .................... 345/63, 345/77, 84, 102, 204, 207, 690; 348/602; 349/61, 62; 315/151, 157, 287, 291
See application file for complete search history.

(56) References Cited

U.S. PATENT DOCUMENTS

| 5,952,992 | A | 9/1999 | Helms |
| 6,229,577 | B1 | 5/2001 | Barth et al. |
| 6,947,017 | B1 | 9/2005 | Gettemy |
| 7,183,727 | B2* | 2/2007 | Ferguson et al. ............. 315/308 |
| 7,227,519 | B1* | 6/2007 | Kawase et al. .................. 345/77 |

(Continued)

FOREIGN PATENT DOCUMENTS

JP         11-341394         12/1999

(Continued)

OTHER PUBLICATIONS

European Application Serial No. 09820434.0, Extended European Search Report mailed May 2, 2012, 5 pgs.

(Continued)

*Primary Examiner* — Joe H Cheng
(74) *Attorney, Agent, or Firm* — RatnerPrestia

(57) ABSTRACT

An illumination controller determines a target brightness setting value from a illuminance value measured by a illumination sensor, determines a brightness correction start time in response to a target brightness setting value and a current brightness setting value and a calculation information that are stored in a memory, calculates an amount of brightness setting change per specified time from the current brightness setting value stored in the memory and the target brightness setting value at a brightness correction start time, and outputs an output brightness setting value in response to the amount of brightness setting change that is calculated. The brightness controller adjusts brightness of the display unit in response to the output brightness setting value output from the illumination controller.

11 Claims, 13 Drawing Sheets

U.S. PATENT DOCUMENTS

| | | | |
|---|---|---|---|
| 7,406,193 B2 * | 7/2008 | Watanabe | 382/168 |
| 7,468,722 B2 * | 12/2008 | Ferguson | 345/102 |
| 7,477,228 B2 * | 1/2009 | Wyatt | 345/102 |
| 7,688,294 B2 * | 3/2010 | Baik | 345/88 |
| 7,865,033 B2 * | 1/2011 | Han et al. | 382/274 |
| 2003/0002736 A1 * | 1/2003 | Maruoka et al. | 382/168 |
| 2003/0227435 A1 * | 12/2003 | Hsieh | 345/102 |
| 2004/0070565 A1 | 4/2004 | Nayar | |
| 2005/0280869 A1 * | 12/2005 | Kameyama | 358/3.01 |
| 2006/0109218 A1 | 5/2006 | Kim | |
| 2008/0111500 A1 * | 5/2008 | Hoover | 315/293 |
| 2008/0180426 A1 | 7/2008 | Liu | |
| 2010/0060674 A1 * | 3/2010 | Yoshida et al. | 345/690 |
| 2010/0194289 A1 | 8/2010 | Katayanagi | |
| 2012/0019493 A1 * | 1/2012 | Barnhoefer et al. | 345/207 |

FOREIGN PATENT DOCUMENTS

| | | |
|---|---|---|
| JP | 2000-082137 A | 3/2000 |
| JP | 2001-502875 A | 2/2001 |
| JP | 2002-351445 A | 12/2002 |
| JP | 2007-065680 A | 3/2007 |
| JP | 2007-225650 A | 9/2007 |
| JP | 2008-042472 A | 2/2008 |
| WO | WO 99/04562 | 1/1999 |

OTHER PUBLICATIONS

International Search Report for International Application No. PCT/JP2009/005340, Jan. 19, 2010, Panasonic Corporation.

* cited by examiner

FIG. 3A

| Target brightness setting value \ Current brightness setting value | 0 | 1 | 2 | 3 | 4 | 5 | 6 | 7 | 8 | 9 | 10 | 11 | 12 |
|---|---|---|---|---|---|---|---|---|---|---|---|---|---|
| 0 | - | 150 | 130 | 110 | 90 | 70 | 50 | 50 | 50 | 50 | 50 | 50 | 50 |
| 1 | 150 | - | 150 | 130 | 110 | 90 | 70 | 50 | 50 | 50 | 50 | 50 | 50 |
| 2 | 130 | 150 | - | 150 | 130 | 110 | 90 | 70 | 50 | 50 | 50 | 50 | 50 |
| 3 | 110 | 130 | 150 | - | 150 | 130 | 110 | 90 | 70 | 50 | 50 | 50 | 50 |
| 4 | 90 | 110 | 130 | 150 | - | 150 | 130 | 110 | 90 | 70 | 50 | 50 | 50 |
| : | : | : | : | : | : | : | : | : | : | : | : | : | : |

· When Difference between the target brightness setting value and the current brightness setting value < Predetermined brightness threshold:
Delay time = Constant value − Specified time x (Difference between the target brightness setting value and the current brightness setting value)

· When Difference between the target brightness setting value and the current brightness setting value ≥ Predetermined brightness threshold:
Delay time = Predetermined value FIG. 8
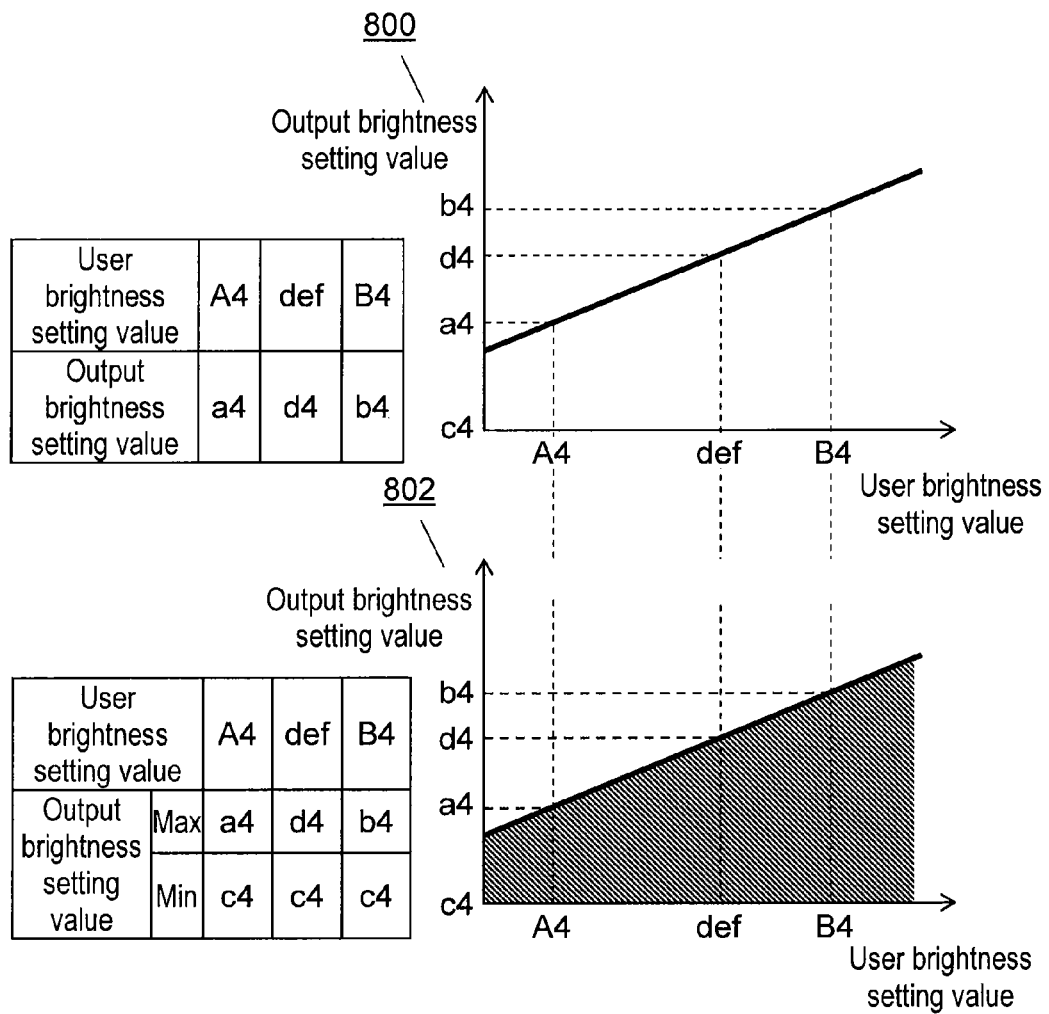
Brightness variable range corresponding to ambient light

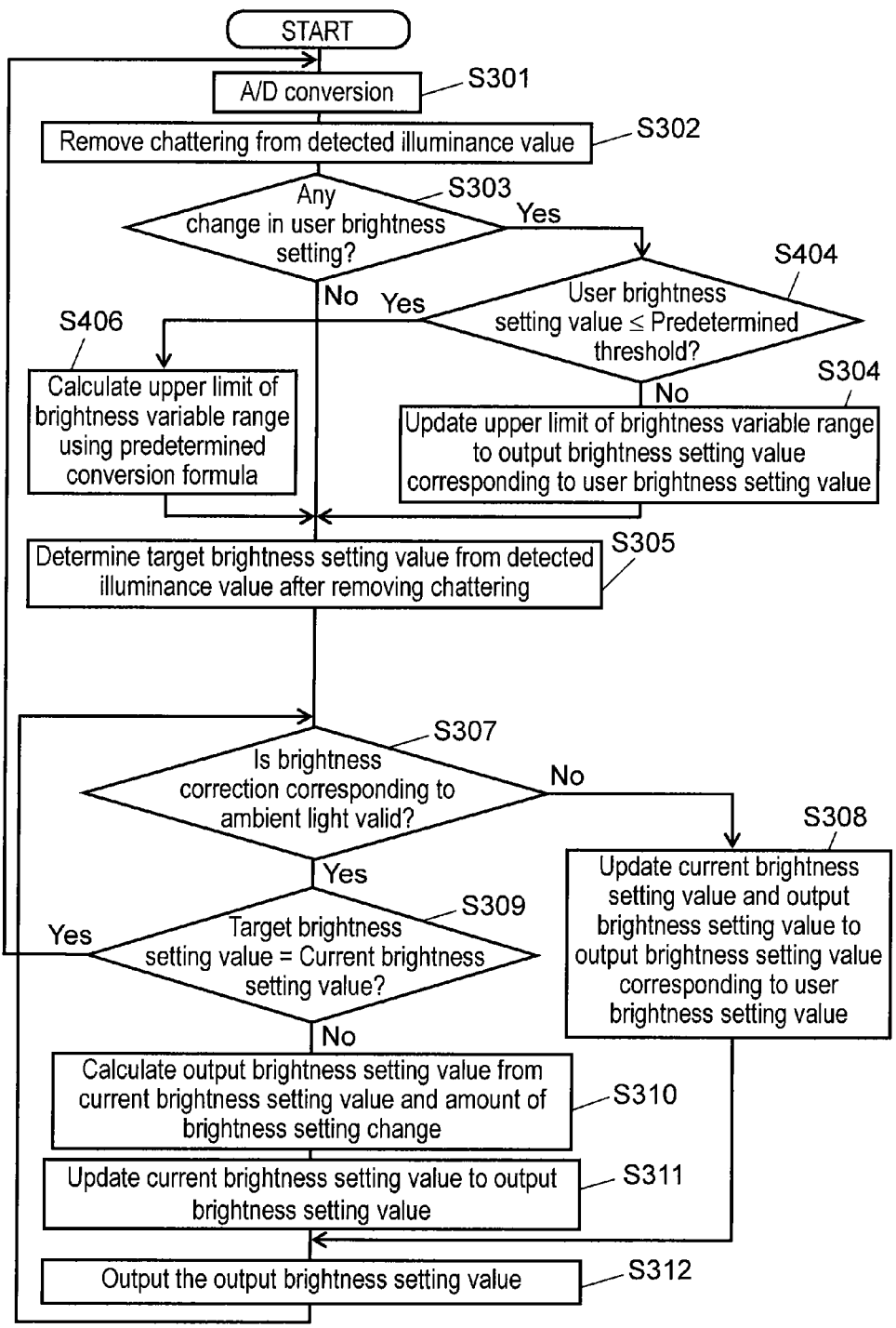

FIG. 12A
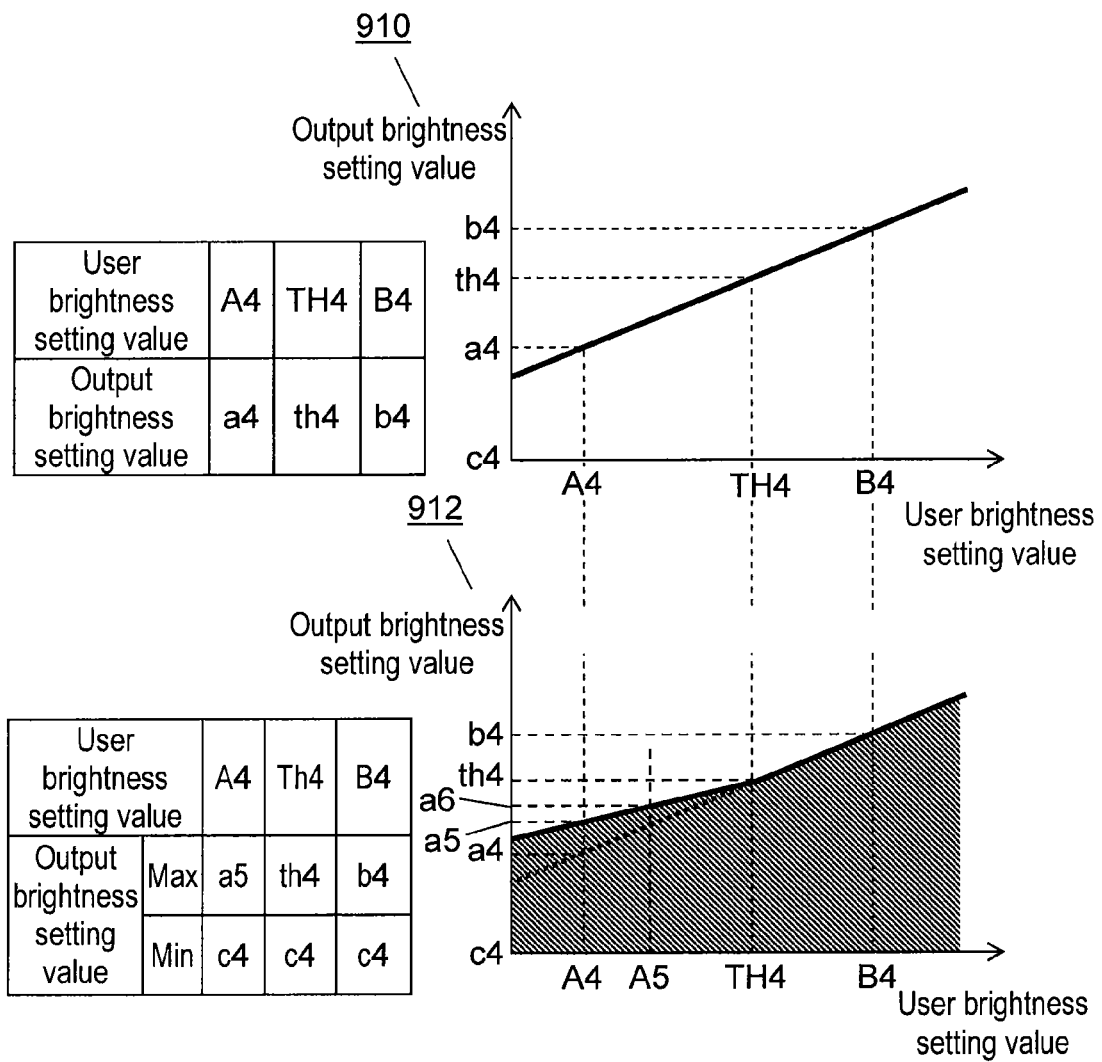
 Brightness variable range corresponding to ambient light

FIG. 12B

```
Example 1
Upper limit of brightness variable range = k1 x (Output brightness setting value
corresponding to user brightness setting value)
In this case, for example, k1 = 1.5 is acceptable Example 2
Upper limit of brightness variable range = k2 x (Output brightness setting value at def -
Output brightness setting value corresponding to user brightness setting value) +
Output brightness setting value corresponding to user brightness setting value
Here, for example, k2 = 0.5 is acceptable
```

BRIGHTNESS CORRECTION DEVICE AND BRIGHTNESS CORRECTION METHOD

TECHNICAL FIELD

The present invention relates to brightness correction devices and brightness correction methods, and more particularly to brightness correction devices and brightness correction methods that can correct the timing to start changing brightness of a display unit corresponding to a change in ambient light due to a significant change in the viewing condition.

BACKGROUND ART

There has been an automated screen correction device for automatically displaying a screen corresponding to a change in ambient light in portable terminals such as mobile terminals and car televisions. This automated screen correction device is equipped with a sensor for measuring the ambient light and outputting an illuminance value, which is ambient environment information. With this structure, the automated screen correction device reads out a brightness adjustment value corresponding to the illuminance value measured by the sensor from a memory. Then, the automated screen correction device sets an optimum illuminance value for the user to a display unit based on calculation of the adjustment value read out and information on display screen mode selected by the user. (For example, refer to Patent Literature 1.)

A conventional brightness correction device, such as this automated screen correction device, determines that the current brightness has changed to a different brightness if, for example, other brightness levels are detected for a predetermined number of times in the current brightness, so as to detect that the brightness has changed. The predetermined number of times is, for example, 50 times.

However, the above conventional brightness correction device frequently changes brightness of display unit due to sensitive reaction to changes in ambient light if light and dark of ambient light significantly changes such as when a car television equipped with this brightness correction device passes through a place where brightness changes again and again, typically a tree-lined street. This results in giving a sense of discomfort to the user.

[Citation List]
[Patent Literature]
[PTL 1] Unexamined Japanese Patent Publication No. 2000-082137

SUMMARY OF THE INVENTION

A brightness correction device of the present invention is a brightness correction device equipped with a display unit, and includes an illumination sensor, a memory, an illumination controller, and a brightness controller.

The illumination sensor measures an illuminance value that is ambient environment information. The memory stores calculation information used for calculating a delay time until a brightness correction start time at which update starts from a current brightness setting value to a target brightness setting value. The illumination controller determines the target brightness setting value based on the illuminance value measured by the illumination sensor. The illumination controller determines the brightness correction start time in response to the target brightness setting value, and the current brightness setting value and calculation information stored in the memory. At the brightness correction start time, the illumination controller also calculates an amount of brightness setting change per specified time based on the current brightness setting value stored in the memory and the target brightness setting value. The illumination controller outputs an output brightness setting value in response to calculated amount of brightness setting change. The brightness controller adjusts brightness of the display unit in response to the output brightness setting value output from the illumination controller.

With this structure, brightness of display unit can be appropriately corrected corresponding to the ambient light under conditions that the ambient light significantly changes while viewing the display unit. Accordingly, the present invention offers images that the user can view with ease.

A brightness correction method of the present invention is a brightness correction method for correcting brightness of a display unit, including the steps of measuring an illuminance value that is ambient environment information; storing a current brightness setting value and calculation information used for calculating a delay time of a brightness correction start time to start updating the current brightness setting value to a target brightness setting value; determining the target brightness setting value from a measured illuminance value; determining the brightness correction start time in response to the target brightness setting value, current brightness setting value, and calculated information; calculating an amount of brightness setting change per specified time based on the current brightness setting value at the brightness correction start time and the target brightness setting value; outputting an output brightness setting value in response to a calculated amount of brightness setting change; and adjusting brightness in response to the output brightness setting value that is output.

BRIEF DESCRIPTION OF DRAWINGS

FIG. 3A illustrates a method of calculating a delay time until starting update of a current brightness setting value to a target brightness setting value based on a determination table in accordance with the first exemplary embodiment.

FIG. 3B is a method of calculating a delay time until starting update of the current brightness setting value to the target brightness setting value based on a determination formula in accordance with the first exemplary embodiment.

FIG. 8 illustrates a relationship between a user brightness setting value and an output brightness setting value, and a brightness variable range in accordance with the second exemplary embodiment.

FIG. 11 is a flow chart illustrating entire processing of an illumination controller in accordance with a fourth exemplary embodiment of the present invention.

FIG. 12A illustrates a relationship between a user brightness setting value and an output brightness setting value, and a brightness variable range in accordance with the fourth exemplary embodiment.

FIG. 12B illustrates an example of formula for calculating an upper limit of the brightness variable range when the user brightness setting value is not greater than a predetermined threshold.

DETAILED DESCRIPTION OF PREFERRED EMBODIMENT (First Exemplary Embodiment)

Figure 1:
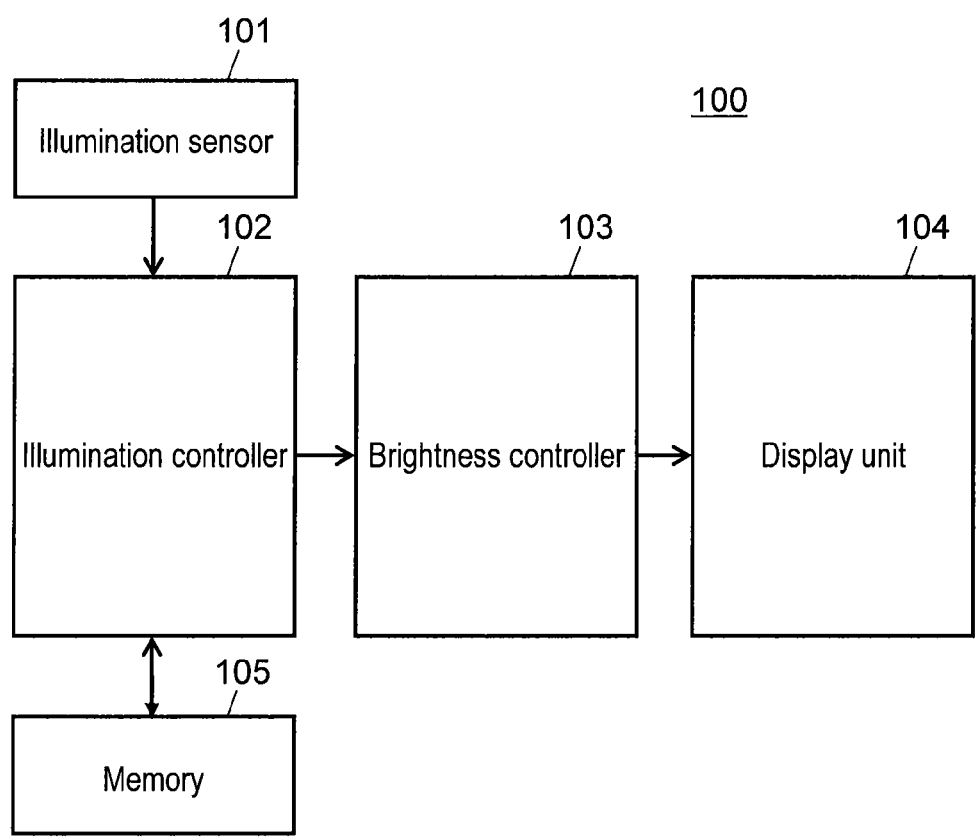
FIG. 1 is a block diagram of a configuration of a brightness correction device in accordance with a first exemplary embodiment of the present invention.

FIG. 1 shows a configuration of brightness correction device 100 in the first exemplary embodiment of the present invention. Brightness correction device 100 includes illumination sensor 101, illumination controller 102, brightness controller 103, display unit 104, and memory 105.

Illumination sensor 101 measures ambient light, and outputs an illuminance value (detected illuminance value) that is ambient environment information of brightness correction device 100. Illumination controller 102 determines a target brightness setting value from the illuminance value measured by illumination sensor 101. The target brightness setting value is a value set as brightness to be displayed on display unit 104 in response to the illuminance value. Illumination controller 102 sets a high target brightness setting value when the ambient light is high. Contrarily, when the ambient light is low, the target brightness setting value is set low. This control enables the user to easily understand contents in display unit 104, and reduces fatigue of the eyes. In addition, wasteful power consumption is preventable.

Memory 105 stores a current brightness setting value for display on display unit 104, and calculation information for calculating a delay time. The delay time is the time until a brightness correction start time at which illumination controller 102 starts updating the current brightness setting value to the target brightness setting value.

Illumination controller 102 determines the brightness correction start time, that is the delay time, in response to the target brightness setting value, and the current brightness setting value and calculation information that are stored in memory 105. Illumination controller 102 in this exemplary embodiment sets a longer delay time when a difference between the current brightness setting value and the target brightness setting value is smaller than a predetermined brightness threshold if there is a difference between the current brightness setting value and the target brightness setting value. Illumination controller 102 also sets the delay time to a predetermined value when a difference between the current brightness setting value and the target brightness setting value is greater than the predetermined brightness threshold.

Next, illumination controller 102 calculates an amount of brightness setting change per specified time based on the current brightness setting value and the target brightness setting value at the brightness correction start time. Illumination controller 102 then calculates and outputs an output brightness setting value to be output to brightness controller 103 in response to the calculated amount of brightness setting change. Detailed processing in brightness controller 103 and illumination controller 102 is described later with reference to FIGS. 2, 3A, and 3B.

Brightness controller 103 adjusts brightness of display unit 104 in response to the output brightness setting value output from illumination controller 102. Display unit 104 is a display device such as a monitor.

Memory 105 stores the calculation information for calculating the delay time as described above. This delay time can be calculated based on either a determination table including the calculation information or a determination formula. How to calculate the delay time is detailed later.

Figure 2:
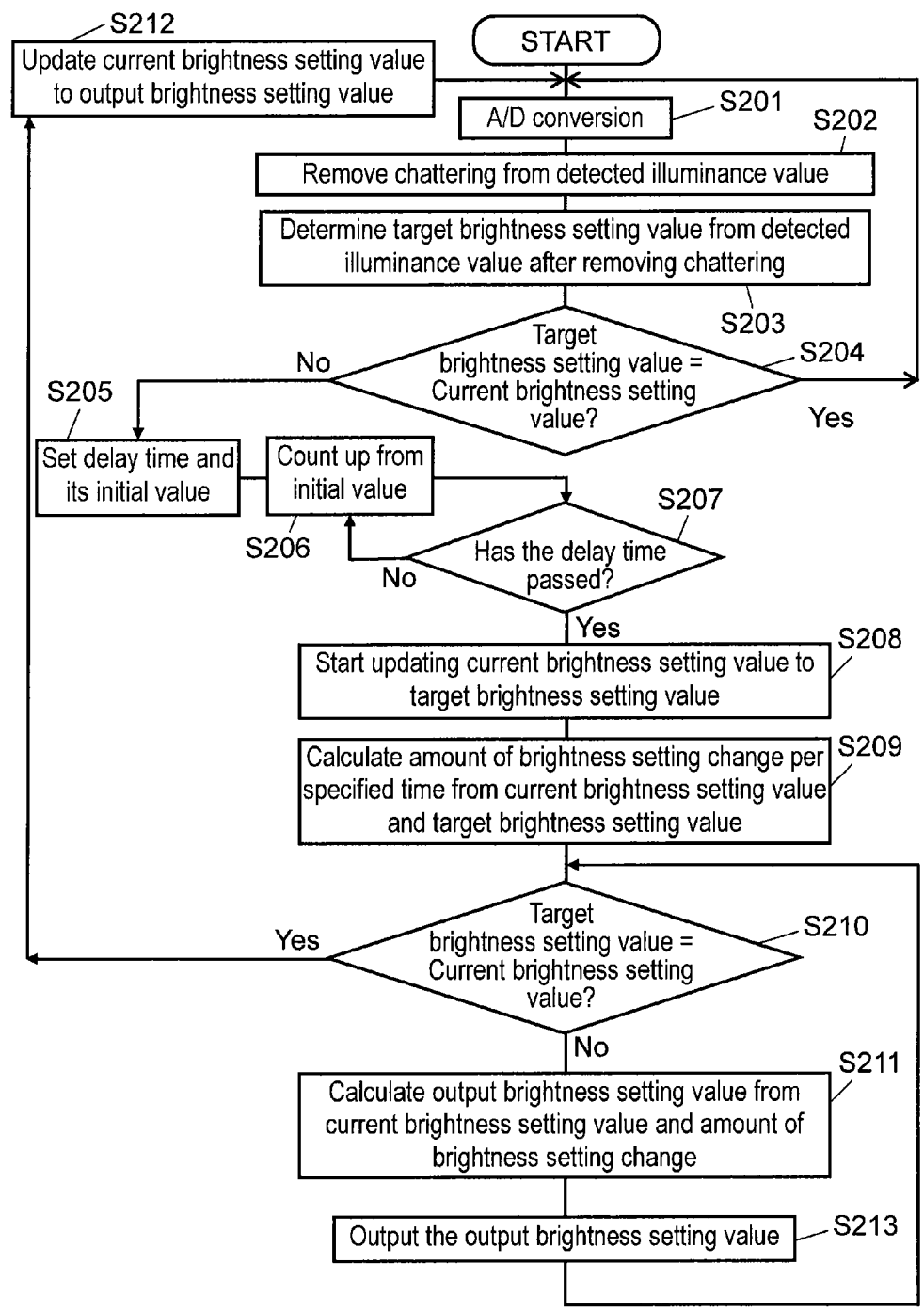
FIG. 2 is a flow chart illustrating entire processing in an illumination controller in accordance with the first exemplary embodiment.

Next, processing of illumination controller 102 is described with reference to FIG. 2. FIG. 2 is a flow chart illustrating entire processing in illumination controller 102 in accordance with this exemplary embodiment. The brightness correction method in this exemplary embodiment is a brightness correction method for correcting brightness of the display unit 104, and includes the following steps. Shown in FIG. 2, Illumination controller 102 measures an illuminance value that is ambient environment information by illumination sensor 101, and converts it from an analog value to a digital value (Step S201). Illumination controller 102 removes chattering of the illuminance value converted to the digital value (Step S202). This is to wait until detected illuminance values converge to almost stable certain value. Next, illumination controller 102 determines a target brightness setting value from the detected illuminance value after removing chattering (Step S203).

Next, illumination controller 102 determines whether the target brightness setting value is same as the current brightness setting value stored in memory 105 (Step S204). If the target brightness setting value is same as the current brightness setting value stored in memory 105 ("Yes" in Step S204), the operation returns to Step S201.

On the other hand, if the target brightness setting value is different from the current brightness setting value stored in memory 105 in Step S204 ("No"), a delay time and an initial value for calculating the delay time are set using calculation methods shown in FIGS. 3A and 3B (Step S205). A method of setting the delay time is detailed later.

From this Step S204 to Step S207 are the steps of determining the brightness correction start time by illumination controller 102 based on the target brightness setting value, and the current brightness setting value and calculation information that are stored in memory 105. Next, illumination controller 102 counts up a predetermined time from the initial value of delay time (Step S206). Then, illumination controller 102 determines whether or not the initial value counted up has reached the delay time (Step S207). If the initial value counted up has not yet reached the delay time ("No" in Step S207), the operation proceeds to Step S206 to further count up the initial value that has been already counted up for a predetermined time. Then, processing in Step S206 and Step S207 are repeated. Through repetition of these processes, the initial value reaches the delay time ("Yes" in Step S206), and the operation proceeds to Step S208. Aforementioned initial value is, for example, 0 ms, and the predetermined time for counting up is, for example, 1 ms.

Methods of calculating delay time include the calculation method based on a determination table shown in FIG. 3A and the calculation method based on determination formula shown in FIG. 3B. FIG. 3A shows the method of calculating the delay time until starting update of the current brightness setting value to the target brightness setting value based on the determination table 301. FIG. 3B shows the method of calculating the delay time until starting update of the current brightness setting value to the target brightness setting value based on determination formula 302.

First, the method of calculating the delay time based on the determination table is described with reference to FIG. 3A. In the calculation method based on the determination table, illumination controller 102 determines the delay time from the target brightness setting value and the current brightness setting value based on the determination table. The determination table includes the calculation information. For example, if the current brightness setting value is "6" and the target brightness setting value is "0," the delay time is "50 msec." In other words, illumination controller 102 delays the timing to start brightness correction for "50 msec" after removing chattering. If the current brightness setting value is "6" and the target brightness setting value is "4," the delay time becomes "130 msec." Accordingly, illumination controller 102 delays the timing to start brightness correction for "130 msec" after removing chattering. It is apparent from FIG. 3A that a predetermined brightness threshold is "6" in this example. A predetermined value for delay time is "50 ms."

On the other hand, in the method of calculating the delay time based on the determination formula as shown in FIG. 3B that includes the calculation information for calculating the delay time, illumination controller 102 first sets the predetermined brightness threshold if there is difference between the current brightness setting value and the target brightness setting value. The predetermined brightness threshold is, for example, "6." If the difference between the target brightness setting value and the current brightness setting value is less than the predetermined brightness threshold, the specified time is multiplied by the difference between the target brightness setting value and the current brightness setting value. Then, the delay time is obtained by subtracting this result of multiplication from a certain value. If the difference between the target brightness setting value and the current brightness setting value is not less than the predetermined brightness threshold, the predetermined value is determined as the delay time. Here, for example, the specified time is "20 ms," the constant value is "170 ms," and the predetermined value is "50 ms."

As described above, two ways are provided to set the delay time until updating the current brightness setting value to the target brightness setting value. They are, for example, the case when the delay time is the predetermined value that is a constant value, and the case when the delay time is changed in response to whether or not difference between the current brightness setting value and the target brightness setting value is large or small. In this way, illumination controller 102 can start changing brightness earlier if the brightness changes significantly, and start changing brightness later if the brightness changes not so much. If the delay time is the predetermined value (e.g. "50 ms"), values are hatched in FIG. 3A for easy identification.

Next, back to FIG. 2, description on the flow of entire processing in illumination controller 102 continues. If the delay time passes in Step S207 ("Yes"), illumination controller 102 starts updating the current brightness setting value to the target brightness setting value (Step S208). Then, illumination controller 102 calculates an amount of brightness setting change per constant time (e.g., 20 msec) from the current brightness setting value and the target brightness setting value (Step S209). Here, illumination controller 102 calculates the amount of brightness setting change such that a change time in which the current brightness setting value reaches the target brightness setting value becomes the predetermined time. The predetermined time is, for example, set from 0.1 sec to 1 sec. Alternatively, the predetermined time may be set as required by the user.

Next, illumination controller 102 determines whether or not the target brightness setting value is same as the current brightness setting value stored in memory 105 (Step S210). If the target brightness setting value and the current brightness setting value stored in memory 105 are different ("No" in Step S210), illumination controller 102 calculates an output brightness setting value from the current brightness setting value and the amount of brightness setting change (Step S211). More specifically, illumination controller 102 adds the current brightness setting value and the amount of brightness setting change, and sets this sum as the output brightness setting value. Illumination controller 102 converts the output brightness setting value to a digital value or PWM output, and outputs it to brightness controller 103 (Step S213). Then the operation returns to Step S210. A series of processing from Step S210 to Step S213 is repeated until the target brightness setting value and the current brightness setting value stored in memory 105 become the same.

On the other hand, if the target brightness setting value and the current brightness setting value stored in memory 105 are same ("Yes" in Step S210), illumination controller 102 updates the output brightness setting value to the current brightness setting value stored in memory 105 (Step S212). Then, the operation returns to Step S201.

Through the above processing, brightness controller 103 corrects brightness of display unit 104 based on the output brightness setting value that is output from illumination controller 102. This enables appropriate correction of brightness of display unit 104 in response to the ambient light. Accordingly, the exemplary embodiment offers images that the user can view with ease.

Figure 4:
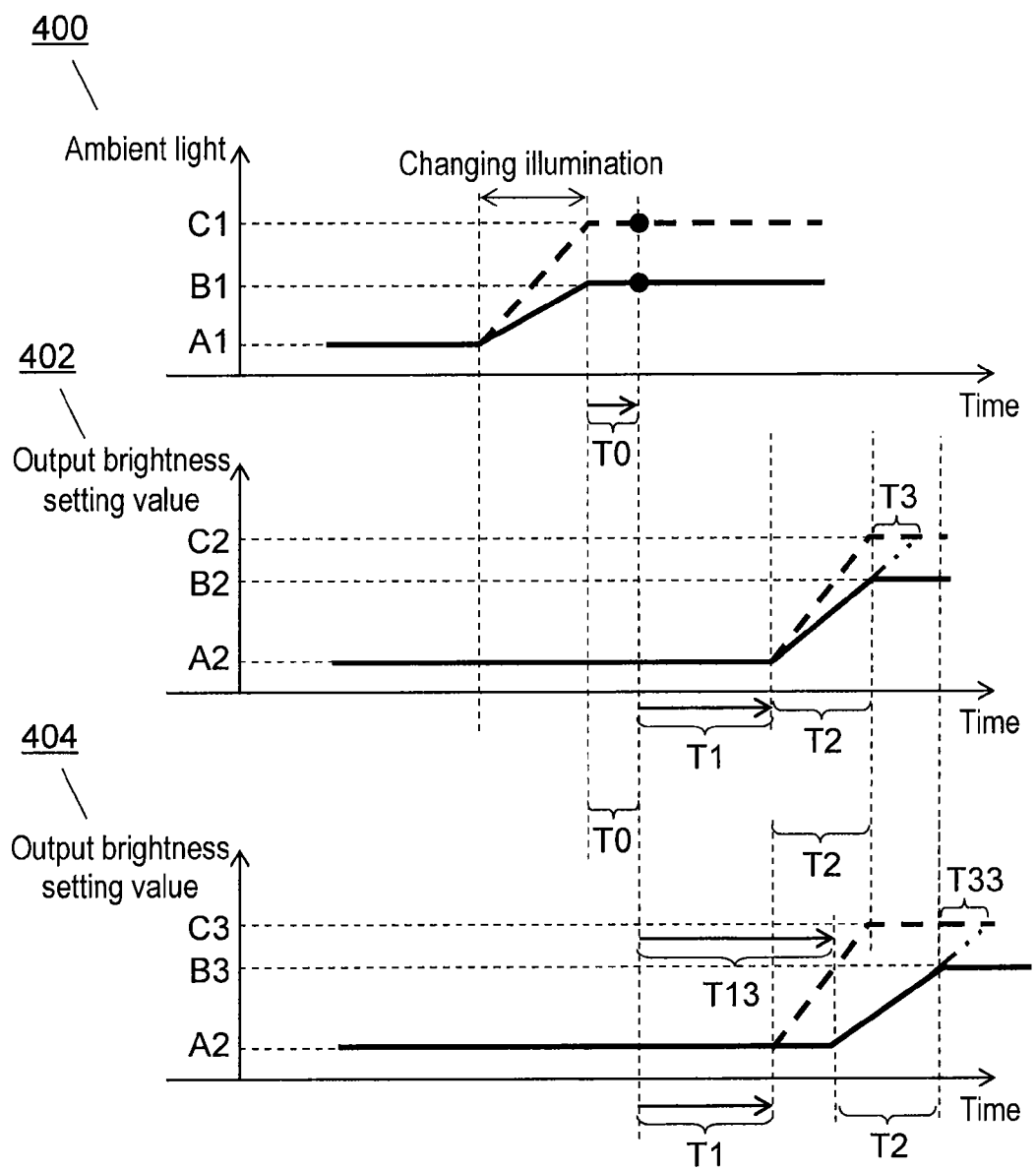
FIG. 4 illustrates brightness correction processing on a time axis when illumination is changed in accordance with the first exemplary embodiment.

FIG. 4 shows brightness correction processing on time axis when the ambient light is changed from illuminance value A1 to illuminance value B1 or illuminance value C1. FIG. 4 shows time change characteristic 400 of ambient light, time change characteristic 402 of the output brightness setting value when delay time T1 does not change, and time change characteristic 404 of the output brightness setting value when delay times T1 and T13 are changed.

For example, as shown by time change characteristic 400 of ambient light, let's assume that illuminance value A1 is changed to illuminance value C1 when the ambient light at present is illuminance value A1 and the current brightness setting value is output brightness setting value A2. First, illumination controller 102 waits for chattering removal time T0 to pass for removing chattering after the ambient light changes to illuminance value C1. Then, illumination controller 102 determines output brightness setting value C2, which is the target brightness setting value, from illuminance value C1 as indicated by time change characteristic 402 of the output brightness setting value. In other words, illumination controller 102 increases the target brightness setting value if the ambient light is high. Contrarily, if the ambient light is low, the target brightness setting value is decreased. Illumination controller 102 then determines delay time T1 for delaying the brightness change start time based on output brightness setting value C2, which is the target brightness setting value, and output brightness setting value A2, which is the current brightness setting value, using the above method. In addition, illumination controller 102 calculates the amount of brightness setting change per specified time (e.g., 20 msec) after delay time T1 passes, based on output brightness setting value A2 and output brightness setting value C2. Here, illumination controller 102 calculates the amount of brightness setting change such that the current brightness setting value becomes the target brightness setting value in a change time of predetermined time T2. Then, illumination controller 102 repeatedly updates and outputs the output brightness setting value so that output brightness setting value A2 reaches output brightness setting value C2 at a speed corresponding to the amount of brightness setting change.

Next, as shown by time change characteristic 402 of the output brightness setting value, let's assume that illuminance value A1 is changed to illuminance value B1 when the ambient light at present is illuminance value A1 and the current brightness setting value is output brightness setting value A2. In this case, illumination controller 102 changes output brightness setting value A2, which is the current brightness setting value, to output brightness setting value B2, which is the target brightness setting value. Here, delay time T1 is assumed to be a constant predetermined value (e.g. 50 ms) hatched in FIG. 3A. In this exemplary embodiment, brightness change time T2 is also same, in addition to delay time T1, in both cases when a large change from output brightness setting value A2 to output brightness setting value C2, and a small change from output brightness setting value A2 to output brightness setting value B2. In other words, the time required for changing brightness can be shortened for time T3, compared to the case of changing output brightness setting value A2 to output brightness setting value C2 at the same speed as changing from output brightness setting value A2 to output brightness setting value B2. Accordingly, the larger illuminance changes, the larger brightness changes. The exemplary embodiment thus offers images easy for the user to view.

Next is described, as shown by time change characteristic 404 of the output brightness setting value, a change in delay times T1 and T13 in response to the target brightness setting value. If a change from output brightness setting value A2, which is the current brightness setting value, to output brightness setting value B2, which is the target brightness setting value, is small, the delay time becomes longer than the case when a change from output brightness setting value A2 to output brightness setting value C2 is large. Accordingly, brightness starts to change later. In other words, delay time T13 is longer than delay time T1. However, brightness change time T2 from output brightness setting value A2 to output brightness setting value B3 is same as when output brightness setting value A2 changes to output brightness setting value C3. Accordingly, brightness change starts in a short period when the ambient light significantly changes so that the brightness changes quickly. If change in the ambient light is small, such as the case of passing through a tree-lined street, brightness starts to change later so that the brightness changes become desensitized. However, once the set brightness starts to change, brightness changes quickly by setting the same brightness change time T2 for the above both cases. Accordingly, the exemplary embodiment offers images that the user can view with ease.

This exemplary embodiment describes the case of changing the brightness from output brightness setting value A2 based on brightness change time T2 from output brightness setting value A2 to output brightness setting value B2. However, a change time from output brightness setting value A2 to output brightness setting value B2 may be the same as a change time from output brightness setting value A2 to output brightness setting value C2 based on the change time from output brightness setting value A2 to output brightness setting value C2.

(Second Exemplary Embodiment)

Figure 5:
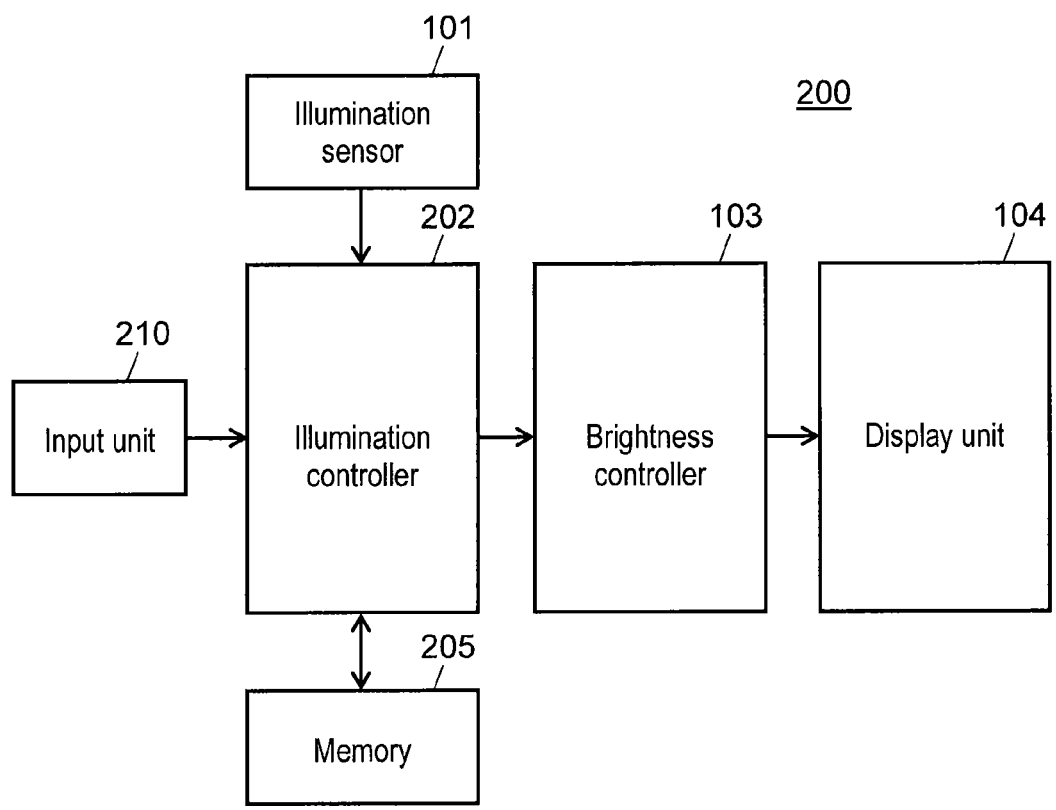
FIG. 5 is a block diagram of a configuration of a brightness correction device in accordance with a second exemplary embodiment of the present invention.

FIG. 5 shows a configuration of brightness correction device 200 in the second exemplary embodiment of the present invention. Brightness correction device 200 includes input unit 210, illumination sensor 101, illumination controller 202, brightness controller 103, display unit 104, and memory 205. In this exemplary embodiment, same reference marks are given to components same as those in the first exemplary embodiment to allow omission of duplicate description.

In brightness correction device 100 in the first exemplary embodiment, illumination controller 102 controls brightness controller 103 such that brightness of display unit 104 can be appropriately corrected corresponding to ambient light even if the ambient light significantly changes while the user views display unit 104. However, illumination controller 102 cannot set a brightness variable range according to the user's preference.

Figure 6:
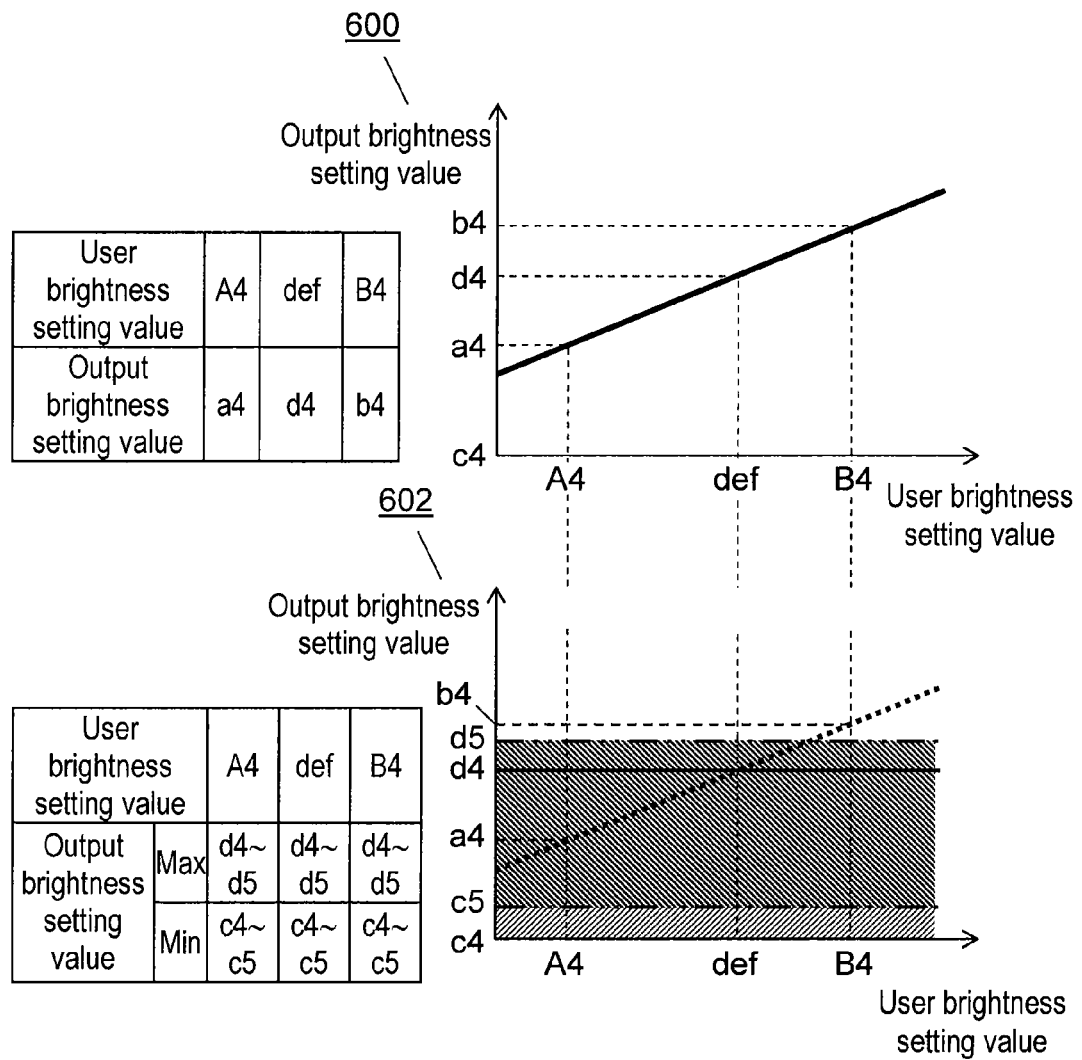
FIG. 6 illustrates an operation when an illumination controller in the brightness correction device can set an output brightness setting value in accordance with the second exemplary embodiment.

FIG. 6 illustrates the operation of brightness correction device 200 equipped with input unit 210 when illumination controller 202 can set an output brightness setting value on the assumption that brightness correction device 200 has a configuration of accepting user input. In other words, FIG. 6 is a drawing to describe an example of the relationship between a user brightness setting value and the output brightness setting value and the brightness variable range. As shown by change characteristic 600 of the output brightness setting value, the output brightness setting value is primarily determined corresponding to the user brightness setting value when brightness correction corresponding to ambient light is invalid. Here, brightness correction corresponding to ambient light is a function of correcting brightness of display unit 104 in response to a change in ambient light, as described in the first exemplary embodiment. Accordingly, if the user sets user brightness setting value A4, for example, output brightness setting value a4 is output from illumination controller 202.

On the other hand, as shown by change characteristic 602 of the output brightness setting value, the output brightness setting value can be changed in a predetermined range according to the user brightness setting value when brightness correction corresponding to ambient light is valid. In other words, if the user sets user brightness setting value A4, for example, illumination controller 202 outputs from output brightness setting value c5 to output brightness setting value d5. With this configuration, the user can set an upper limit of brightness variable range (from output brightness setting value d4 to output brightness setting value d5 in FIG. 6) and a lower limit (from output brightness setting value c4 to output brightness setting value c5 in FIG. 6) when brightness correction corresponding to ambient light is valid.

However, even if brightness correction device 100 has the input unit, and user inputs are accepted, variable output brightness setting values alone are not sufficient. This is because since the brightness variable range does not depend on user brightness setting value A4 or user brightness setting value B4, the user brightness setting is not reflected on brightness variable range and brightness output corresponding to the ambient light.

Therefore, the inventors further examined a configuration of brightness correction device 200 that can reflect the user brightness setting on the brightness variable range and brightness output corresponding to the ambient light.

First, the operation of brightness correction device 200 in this exemplary embodiment is described with reference to FIG. 5. Input unit 210 accepts brightness setting information input by the user. The user operates keys, for example, to switch over between validity and invalidity of brightness correction corresponding to ambient light or change the user brightness setting value. In other words, the brightness setting information is setting information on validity and invalidity of brightness correction corresponding to ambient light, user brightness setting value, and so on.

If brightness correction corresponding to ambient light is invalid, brightness of display unit 104 is determined by the user brightness setting value. Illumination sensor 101 measures the ambient light, and outputs an illuminance value, which is ambient environment information of brightness correction device 200. Illumination controller 202 determines the brightness variable range according to the user brightness setting, and also determines the target brightness setting value based on the illuminance value measured by illumination sensor 101 and the brightness variable range. Illumination controller 202 also calculates the output brightness setting value based on the target brightness setting value and the current brightness setting value, and outputs it to brightness controller 103. Processing in illumination controller 202 is detailed later with reference to FIG. 7.

Brightness controller 103 adjusts brightness of display unit 104 in response to the output brightness setting value input from illumination controller 202. Display unit 104 is a display device such as a monitor. Memory 205 stores the current brightness setting value for display on display unit 104. Memory 205 also stores the upper limit and lower limit of the brightness variable range based on the user brightness setting.

Figure 7:
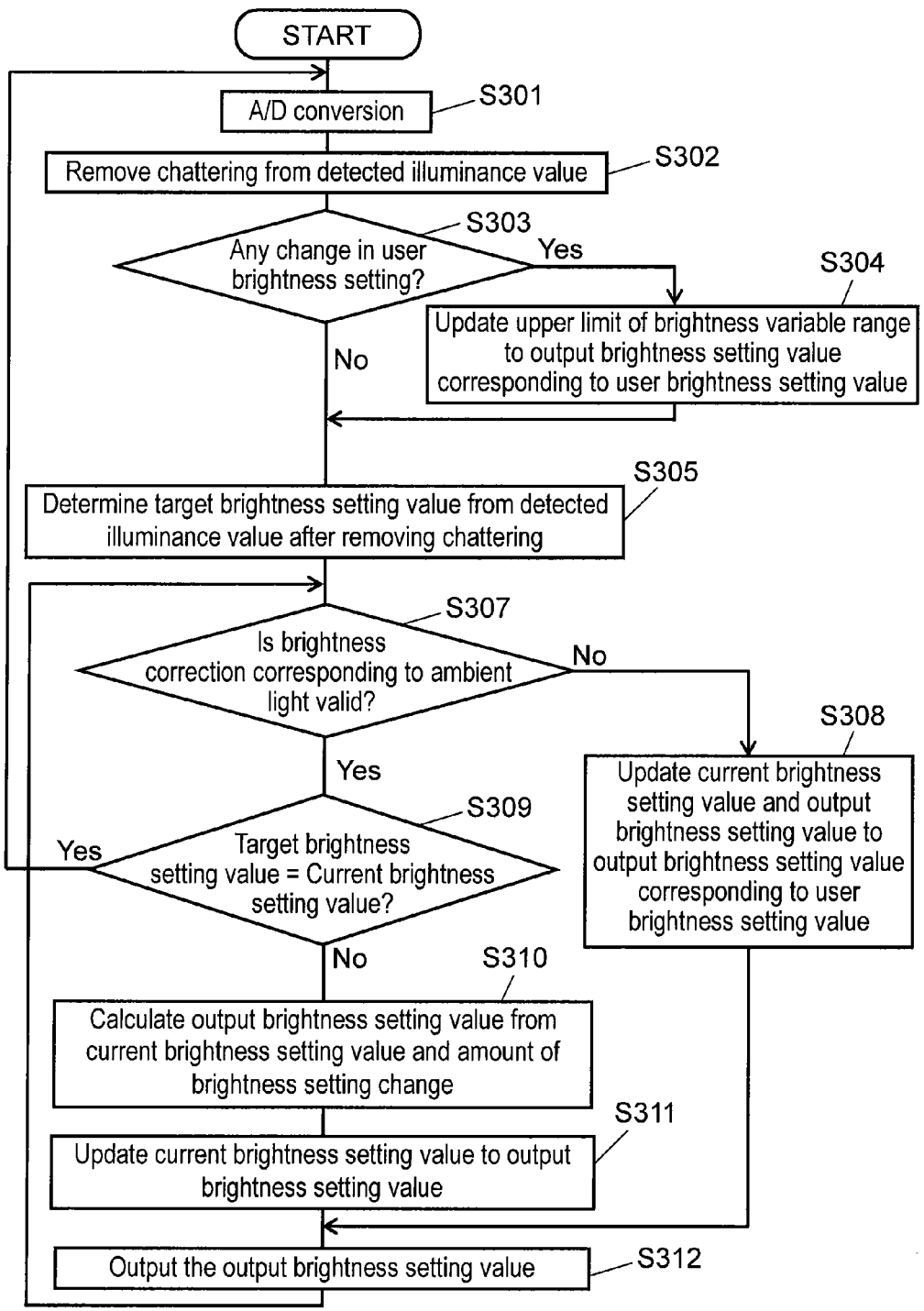
FIG. 7 is a flow chart illustrating entire processing of the illumination controller in accordance with the second exemplary embodiment.

Next, processing in illumination controller 202 is described with reference to FIG. 7. FIG. 7 is a flow chart illustrating the entire processing in illumination controller 202.

First, illumination controller 202 converts the illuminance value measured by illumination sensor 101 from an analog to digital value (Step S301). Then, chattering of illuminance value (detected illuminance value) converted to a digital value is removed, and the detected illuminance value after removing chattering is determined (Step S302).

Next, if the user changes the user brightness setting value ("Yes" in Step S303), the upper limit of brightness variable range is updated to the output brightness setting value corresponding to the user brightness setting value (Step S304). At this point, a conversion formula for converting the user brightness setting value to the brightness output may be used for calculating the output brightness setting value. Then, the target brightness setting value is determined from the detected illuminance value after removing chattering in Step S302 (Step S305). On the other hand, if the user does not change the user brightness setting value ("No" in Step S303), the operation proceeds to Step S305.

Next, if brightness correction corresponding to ambient light is valid ("Yes" in Step S307) and the target brightness setting value and the current brightness setting value stored in memory 205 are different ("No" in Step S309), the output brightness setting value is calculated based on the current brightness setting value and an amount of brightness setting change (Step S310). More specifically, a sum of the current brightness setting value and the amount of brightness setting change is set as the output brightness setting value. Here, the amount of brightness setting change may be either a constant value or a value determined by calculating the current brightness setting value and the target brightness setting value. Then, the current brightness setting value stored in memory 205 is updated to the output brightness setting value (Step S311), and the output brightness setting value is converted to a digital value or PWM output, and this is output to brightness controller 103 (Step S312). The operation then returns to Step S307 to repeat a series of processing.

On the other hand, if brightness correction corresponding to ambient light is valid ("Yes" in Step 307) and the target brightness setting value and the present brightness setting value stored in memory 205 are the same ("Yes" in Step S309), processing from Step S301 to Step 309 is repeated. Through the above processing, brightness controller 103 corrects brightness of display unit 104 based on the output brightness setting value output from illumination control unit 202.

If brightness correction corresponding to ambient light is invalid ("No" in Step S307), the current brightness setting value and the output brightness setting value are updated to an output brightness setting value corresponding to the user adjustment value (Step S308). The output brightness setting value is then converted to a digital value or PWM output, and this is output to brightness controller 103 (Step S312). The operation returns to Step S307 to repeat a series of processing.

FIG. 8 shows the relationship between the user brightness setting value and the output brightness setting value in this exemplary embodiment. As shown by change characteristic 800 of the output brightness setting value, the output brightness setting value is primarily determined according to the user brightness setting value if brightness correction corresponding to ambient light is invalid. On the other hand, as shown by change characteristic 802 of the output brightness setting value, this exemplary embodiment narrows the brightness variable range when the user brightness setting value is set darker, such as user brightness setting value A4, than user brightness setting value def that is a default setting value, if brightness correction corresponding to ambient light is valid. More specifically, the brightness variable range is from output brightness setting value c4 to output brightness setting value a4. On the other hand, when the user brightness setting value is set brighter, such as user brightness setting value B4, than user brightness setting value def that is a default setting value, the brightness variable range is broadened. More specifically, the brightness variable range is from output brightness setting value c4 to output brightness setting value b4.

In this way, the output brightness setting value is determined based on the ambient light and the brightness variable range. Accordingly, under the same ambient light, brightness of display unit 104 changes in line with a change in the brightness variable range if the user brightness setting value changes.

In Step S304, the upper limit of brightness variable range is updated corresponding to the user brightness setting value. However, the lower limit of brightness variable range may be updated corresponding to the user brightness setting value. In other words, as described above, memory 205 in brightness correction device 200 in this exemplary embodiment stores arithmetic information for calculating at least one of the upper limit and the lower limit of the brightness variable range. Here, the arithmetic information is information for setting at least one of the upper limit and lower limit of the brightness variable range in response to the input brightness setting information. Illumination controller 202 calculates at least one of the upper limit and lower limit of the brightness variable range in response to the input brightness setting information and the stored arithmetic information, and also determines the output brightness setting value based on the measured illuminance value and the calculated brightness variable range. With this configuration, this exemplary embodiment enables appropriate correction of the brightness variable range and brightness of display unit according to the user brightness setting value.

(Third Exemplary Embodiment)

Figure 9:
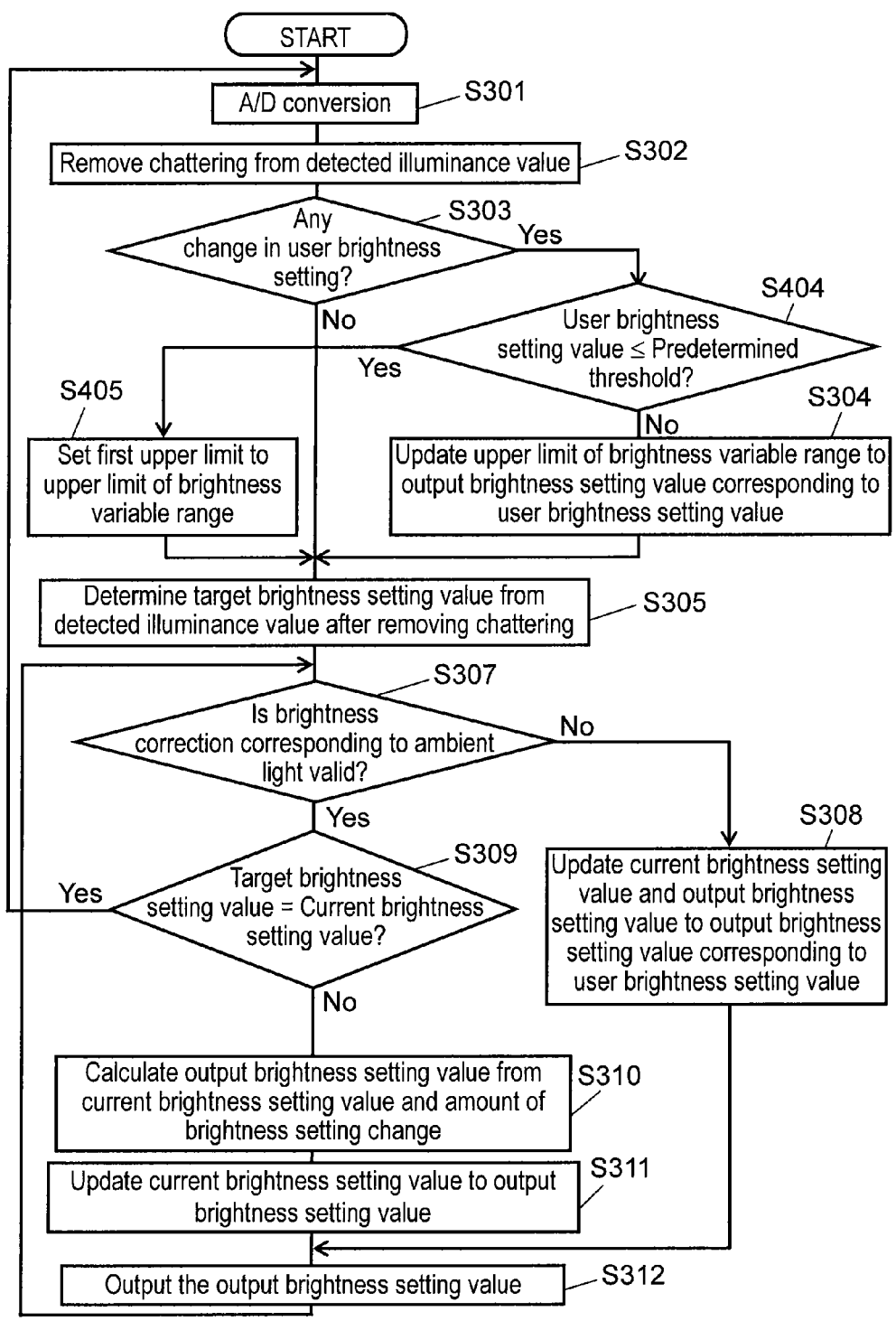
FIG. 9 is a flow chart illustrating entire processing of an illumination controller in accordance with a third exemplary embodiment of the present invention.

FIG. 5 is a configuration of brightness correction device 200 in the third exemplary embodiment of the present invention. In this exemplary embodiment, same reference marks are given to components same as those in the second exemplary embodiment to omit duplicate description. FIG. 9 is a flow chart illustrating the entire processing in illumination controller 202 in the third exemplary embodiment of the present invention. In FIG. 9, same reference marks are given to processes same as those in the second exemplary embodiment to omit duplicate description.

In brightness correction device 200 in this exemplary embodiment, memory 205 stores a first upper limit of a brightness variable range, and this first upper limit of brightness variable range is set as the upper limit of brightness variable range if a user brightness setting value is not greater than a predetermined threshold. This point differs from the second exemplary embodiment. The predetermined threshold may be any brightness setting value in a range that the user can set the user brightness setting value.

More specifically, Step S404 and Step S405 in FIG. 9 differ from the second exemplary embodiment. If the user brightness setting value that is set is not greater than the predetermined threshold ("Yes" in Step S404), the first upper limit of brightness variable range is set as the upper limit of brightness variable range (Step S405). This ensures that the upper limit of brightness variable range is the first upper limit of brightness variable range if brightness correction corresponding to ambient light is valid.

On the other hand, if the user brightness setting value that is set is greater than the predetermined threshold ("No" in Step S404), the upper limit of brightness variable range is updated to the output brightness setting value corresponding to the user brightness setting value (Step S304).

Figure 10:
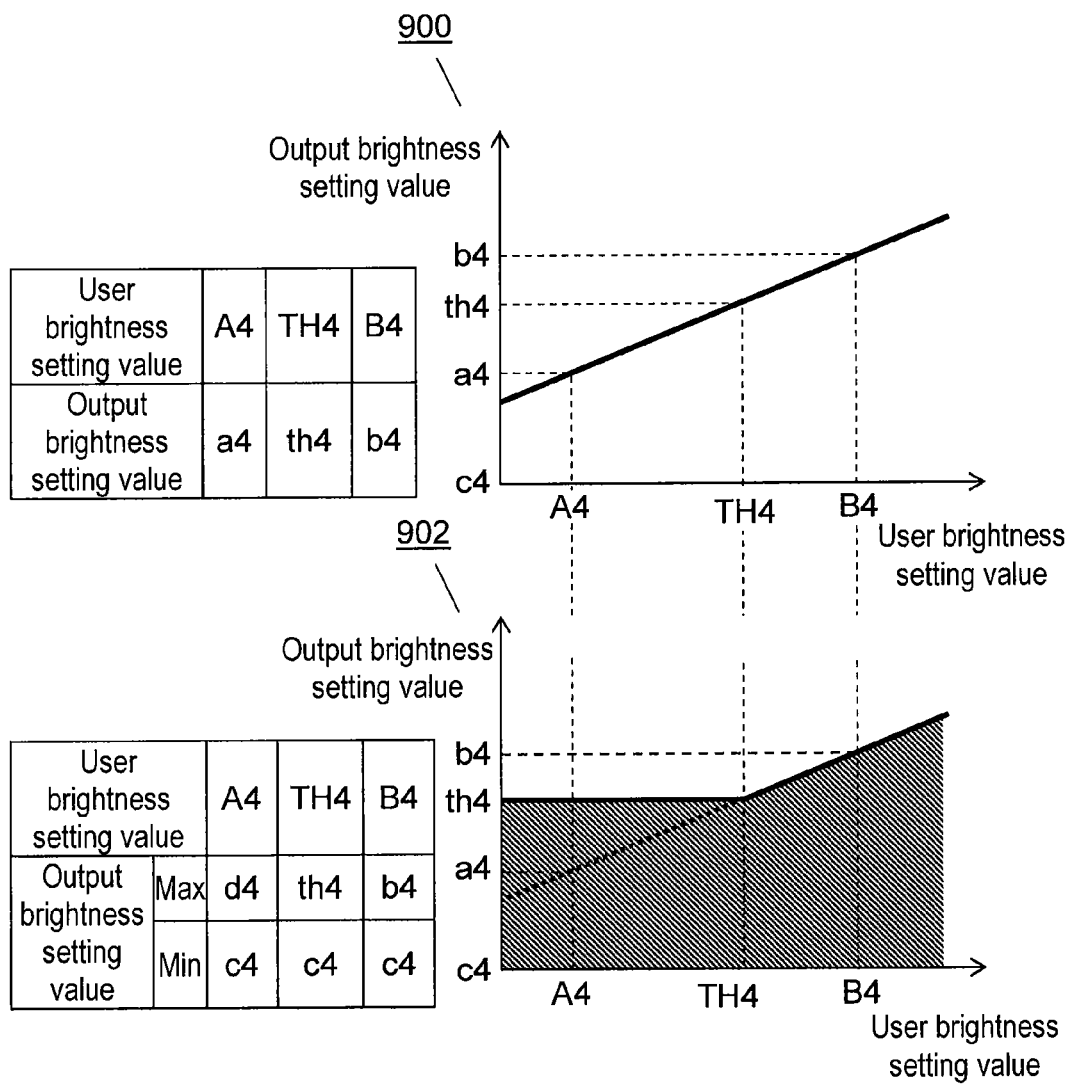
FIG. 10 illustrates a relationship between a user brightness setting value and an output brightness setting value, and a brightness variable range in accordance with the third exemplary embodiment.

FIG. 10 shows the relationship between the user brightness setting value and the output brightness setting value in this exemplary embodiment. As shown by change characteristic 900 of the output brightness setting value, the output brightness setting value is primarily determined according to the user brightness setting value if brightness correction corresponding to ambient light is invalid. On the other hand, as shown by change characteristic 902 of the output brightness setting value, the upper limit of brightness variable range is set to output brightness setting value th4 as the first upper limit of brightness variable range when the user brightness setting value is set darker, such as user brightness setting value A4, than predetermined threshold TH4, if brightness correction corresponding to ambient light is valid. Accordingly, the brightness variable range is constant although the user brightness setting value is slightly changed. In other words, the brightness variable range is from output brightness setting value c4 to output brightness setting value th4. On the other hand, when the user brightness setting value is set brighter, such as user brightness setting value B4, than predetermined threshold TH4, the brightness variable range becomes broader than the case when the user brightness setting is not greater than predetermined threshold TH4. In other words, the brightness variable range is from output brightness setting value c4 to output brightness setting value b4.

The output brightness setting value is determined based on the ambient light and the brightness variable range. Accordingly, under the same ambient light, brightness of display unit 104 changes in lien with a change in the brightness variable range if the user brightness setting value changes greater than threshold TH4.

This exemplary embodiment thus secures the brightness variable range above a certain level even if the user brightness setting value is set darker. Accordingly, if the ambient becomes bright after setting the user brightness darker in a dark place, for example, brightness of the display unit can be appropriately corrected in response to the ambient light even if brightness correction corresponding to ambient light is made valid.

Output brightness setting value th4 as the first upper limit of brightness variable range may be a constant value or a value set by the user.

In Step S405, output brightness setting value th4 is updated as the first upper limit of brightness variable range corresponding to the user brightness setting value. Alternatively, output brightness setting value c4 may be updated as a first lower limit of the brightness variable range corresponding to the user brightness setting value. In other words, memory 205 of brightness correction device 200 in this exemplary embodiment as described above further stores the predetermined threshold and at least one of output brightness setting value th4 and output brightness setting value c4 corresponding to the predetermined threshold. If the brightness setting information that is input is greater than the predetermined threshold that is stored, the arithmetic information is information for setting at least one of the upper limit and lower limit of the brightness variable range corresponding to the brightness setting information that is input. On the other hand, if the brightness setting information that is input is not greater than the predetermined threshold that is stored, the arithmetic information is information for setting at least one of output brightness setting value th4 and output brightness setting value c4 corresponding to at least one of the upper limit and lower limit of the brightness variable range.

(Fourth Exemplary Embodiment)

FIG. 5 is a configuration of brightness correction device 200 in the fourth exemplary embodiment of the present invention. In this exemplary embodiment, same reference marks are given to components same as those in the third exemplary embodiment to omit duplicate description. FIG. 11 is a flow chart illustrating the entire processing of illumination controller 202 in the fourth exemplary embodiment of the present invention. In FIG. 11, same reference marks are given to processes same as those in the third exemplary embodiment to omit duplicate description.

In brightness correction device 200 in this exemplary embodiment, a conversion formula for converting the user brightness setting value to the output brightness setting value is stored in memory 205 in a divided manner such that for cases when the user brightness setting values are not greater than predetermined threshold TH4 and for cases when the user brightness setting values are greater than predetermined threshold TH4. This point is different from the third exemplary embodiment.

More specifically, Step S406 in FIG. 11 differs from the third exemplary embodiment. More specifically, if the user brightness setting value that is set is not greater than predetermined threshold TH4 ("Yes" in Step S404), the upper limit of brightness variable range is calculated using a predetermined conversion formula different from that for when the user brightness setting value is greater than predetermined threshold TH4 (Step S406). This enables the upper limit of brightness variable range to be greater than the upper limit of brightness variable range if brightness correction corresponding to ambient light is valid. Alternatively, the upper limit can be made less than the upper limit of brightness variable range.

FIG. 12A illustrates the relationship between the user brightness setting value and the output brightness setting value in this exemplary embodiment. As shown by change characteristic 910 of the output brightness setting value, the output brightness setting value is primarily determined in response to the user brightness setting value if brightness correction corresponding to ambient light is invalid. On the other hand, as shown by change characteristic 912 of the output brightness setting value, the brightness variable range is from output brightness setting value c4 to output brightness setting value a5 when the user brightness setting value is set darker, such as user brightness setting value A4, than predetermined threshold TH4, if brightness correction corresponding to ambient light is valid. In case of user brightness setting A5, the brightness variable range is from output brightness setting value c4 to output brightness setting value a6. Accordingly, the exemplary embodiment enables to secure a certain degree of brightness variable range while reflecting the user brightness setting value. If the user brightness setting value is set brighter, such as user brightness setting value B4, than predetermined threshold TH4, the brightness variable range is from output brightness setting value c4 to output brightness setting value b4. This is the brightness variable range corresponding to the user brightness setting.

FIG. 12B shows an example of a formula for calculating the upper limit of brightness variable range when the user brightness setting value is not greater than predetermined threshold TH4. For calculating the upper limit of brightness variable range, a calculation formula indicated in Example 1 or Example 2 is used. In Example 1, the upper limit of brightness variable range is multiplication of any coefficient k1 by the brightness setting value corresponding to the user brightness setting value. Here, k1 is a predetermined coefficient greater than 1 (e.g. k1=1.5 is acceptable). In Example 2, the brightness setting value corresponding to the user brightness setting value is subtracted from the brightness setting value at predetermined threshold TH4, and this is multiplied by coefficient k2. Then, the brightness setting value corresponding to the user brightness setting value is added to obtain the upper limit of brightness variable range. Here, k2 is a predetermined coefficient less than 1 (e.g. k2=0.5 is acceptable).

Since the output brightness setting value is determined based on the ambient light and the brightness variable range, brightness of display unit 104 changes in line with a change in brightness variable range if the user brightness setting value changes above than predetermined threshold TH4 under the same ambient light.

In Step S406, the upper limit of brightness variable range is calculated using the predetermined conversion formula different from the case when the user brightness setting value is greater than predetermined threshold TH4. However, the lower limit of brightness variable range may be calculated using a predetermined conversion formula different from the case when the user brightness setting value is greater than threshold TH4. In other words, memory 205 of brightness correction device 200 in this exemplary embodiment stores predetermined threshold TH4 and the predetermined calculation formula for calculating at least one of the upper limit and lower limit of brightness variable range. The arithmetic information sets at least one of the upper limit and lower limit of brightness variable range corresponding to the input brightness setting information if the input brightness setting information is greater than predetermined threshold TH4 stored. The arithmetic information is information for calculating at least one of the upper limit and lower limit of brightness variable range using the predetermined calculation formula if the brightness setting information input is not greater than stored predetermined threshold TH4.

In this exemplary embodiment, brightness of the display unit can be appropriately corrected while reflecting the brightness setting value preferred by the user and also securing a certain level or higher brightness variable range, even if the user brightness setting value is set somewhat darker.

This exemplary embodiment refers to one predetermined threshold TH4 for the user setting brightness value set by the user. Alternatively, multiple predetermined thresholds TH4 may be provided. If the user brightness setting value crosses multiple predetermined thresholds TH4, the calculation formula for the upper limit and lower limit of different brightness variable range may be changed to use a different calculation formula.

INDUSTRIAL APPLICABILITY

The present invention enables appropriate correction of brightness of a display unit in response to an ambient light even if the ambient light for viewing the display unit significantly changes. The present invention thus offers images that the user can view with ease. Accordingly, the present invention is effectively applicable to portable devices that display video signals, including car televisions and mobile terminals.

REFERENCE MARKS IN THE DRAWINGS

100 Brightness correction device
101 Illumination sensor
102 Illumination controller
103 Brightness controller
104 Display unit
105 Memory
200 Brightness correction device
202 Illumination controller
205 Memory
210 Input unit
a4, a5, a6, b4, c4, d4, c5, d5 Output brightness setting value
th4 Output brightness setting value (first upper limit)
TH4 Predetermined threshold
A1, B1, C1 Illuminance value
A2, B2, B3, C2, C3 Output brightness setting value
A4, B4 User brightness setting value
T0 Chattering removal time
T2 Brightness change time
T1, T13 Delay time

The invention claimed is:

1. A brightness correction device equipped with a display unit, comprising:
   an illumination sensor for measuring an illuminance value that is ambient environment information;
   a memory for storing a current brightness setting value and calculation information used for calculating a delay time until a brightness correction start time to start updating the current brightness setting value to a target brightness setting value;
   an illumination controller for determining the target brightness setting value from the illuminance value measured by the illumination sensor, determining the brightness correction start time in response to the target brightness setting value, the current brightness setting value and the calculation information stored in the memory, calculating an amount of brightness setting change per specified time based on the current brightness setting value stored in the memory and the target brightness setting value at the brightness correction start time, and outputting an output brightness setting value in response to the amount of brightness setting change that is calculated; and
   a brightness controller for adjusting brightness of the display unit in response to the output brightness setting value output from the illumination controller.

2. The brightness correction device of claim 1, wherein when the current brightness setting value differs from the target brightness setting value, the illumination controller:

extends the delay time, if a difference between the current brightness setting value and the target brightness setting value is smaller than a predetermined brightness threshold, the delay time being longer as the difference being smaller; and sets a predetermined value to the delay time if the difference between the current brightness setting value and the target brightness setting value is not less than the predetermined brightness threshold.

3. The brightness correction device of claim 1, wherein the illumination controller has a determination table including the calculation information, the illumination controller determining the delay time from the target brightness setting value and the current brightness setting value based on the determination table.

4. The brightness correction device of claim 1, wherein when the current brightness setting value differs from the target brightness setting value, if the difference between the target brightness setting value and the current brightness setting value is less than a predetermined brightness threshold, the illumination controller multiplies a specified time by a difference between the target brightness setting value and the current brightness setting value to obtain a multiplication result, and determines the delay time by subtracting the multiplication result from an initial value; and if the difference between the target brightness setting value and the current brightness setting value is not less than the predetermined brightness threshold, the illumination controller sets a predetermined value to the delay time.

5. The brightness correction device of claim 1, wherein the illumination controller calculates the amount of brightness setting change such that a change time is a predetermined time, the change time being a time until the current brightness setting value reaches the target brightness setting value.

6. The brightness correction device of claim 1, further comprising an input unit for inputting brightness setting information, wherein the memory further stores arithmetic information for calculating at least one of an upper limit and a lower limit of a brightness variable range; and the illumination controller calculates at least one of the upper limit and the lower limit of the brightness variable range in response to the brightness setting information that is input and the arithmetic information that is stored, and also determines the output brightness setting value from the illuminance value that is measured and the brightness variable range that is calculated.

7. The brightness correction device of claim 6, wherein the arithmetic information is information for setting at least one of the upper limit and the lower limit of the brightness variable range corresponding to the brightness setting information that is input.

8. The brightness correction device of claim 6, wherein the memory further stores a predetermined threshold and at least one of a first upper limit and a first lower limit corresponding to the predetermined threshold; and if the brightness setting information that is input is greater than the predetermined threshold that is stored, the arithmetic information is information for setting at least one of the upper limit and the lower limit of the brightness variable range corresponding to the brightness setting information that is input; and if the brightness setting information that is input is not greater than the predetermined threshold, the arithmetic information is information for setting at least one of the first upper limit and the first lower limit to at least one of the corresponding upper limit and the lower limit of the brightness variable range.

9. The brightness correction device of claim 6, wherein the memory stores a predetermined calculation formula for calculating a predetermined threshold and at least one of the upper limit and the lower limit of the brightness variable range; and if the brightness setting information that is input is greater than the predetermined threshold that is stored, the arithmetic information is information for setting at least one of the upper limit and the lower limit of the brightness variable range corresponding to the brightness setting information that is input; and if the brightness setting information that is input is not greater than the predetermined threshold that is stored, the arithmetic information is information for calculating at least one of the upper limit and the lower limit of the brightness variable range using the predetermined calculation formula.

10. A brightness correction method for correcting brightness of a display unit, the method comprising:

measuring an illuminance value that is ambient environment information;

storing a current brightness setting value and calculation information used for calculating a delay time until a brightness correction start time to start updating the current brightness setting value to a target brightness setting value;

determining the target brightness setting value from the illuminance value that is measured;

determining the brightness correction start time in response to the target brightness setting value, the current brightness setting value, and the calculation information;

calculating an amount of brightness setting change per specified time based on the current brightness setting value and the target brightness setting value at the brightness correction start time;

outputting an output brightness setting value in response to the amount of brightness setting change that is calculated; and adjusting brightness in response to the output brightness setting value that is output.

11. The brightness correction method of claim 10, wherein
arithmetic information for calculating at least one of an upper limit and a lower limit of a brightness variable range is stored in the step of storing; and
at least one of the upper limit and the lower limit of the brightness variable range is calculated using the brightness setting information that is input and the arithmetic information that is stored, and the output brightness setting value is determined from the illuminance value that is measured and the brightness variable range that is calculated in the step of outputting the output brightness setting value.

* * * * *